(12) United States Patent
Lawson

(10) Patent No.: US 6,345,814 B1
(45) Date of Patent: Feb. 12, 2002

(54) COMPOSITE PROGRESSIVE ACCORDION SPRING

(75) Inventor: Robert C. Lawson, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/665,425

(22) Filed: Sep. 20, 2000

(51) Int. Cl.[7] .................................................. F16F 1/00
(52) U.S. Cl. ........................ 267/70; 267/220; 267/153; 138/121
(58) Field of Search ......................... 267/70, 122, 107, 267/162, 161, 153, 148, 149, 151, 219, 220, 144; 29/454; 138/121, 123, 174, 109; 264/505, 506, 507; 156/192

(56) References Cited

U.S. PATENT DOCUMENTS

| | | | | |
|---|---|---|---|---|
| 2,678,685 A | * | 5/1954 | Volsk ........................... | 267/144 |
| 2,981,534 A | * | 4/1961 | Peras ........................... | 267/220 |
| 3,407,102 A | * | 10/1968 | Wilkinson ............... | 138/121 X |
| 3,626,988 A | * | 12/1971 | Chu ............................ | 138/121 |
| 3,741,598 A | * | 6/1973 | Novak et al. ................ | 267/122 |
| 4,477,061 A | * | 10/1984 | Kawaura et al. ............ | 267/220 |
| 4,801,019 A | * | 1/1989 | Smolen, Jr. .................. | 267/151 |
| 4,962,916 A | * | 10/1990 | Palinkas ...................... | 267/153 |
| 5,240,269 A | * | 8/1993 | Kerr ......................... | 267/153 X |
| 5,280,890 A | * | 1/1994 | Wydra ......................... | 267/220 |
| 5,791,581 A | * | 8/1998 | Loeffler et al. ............. | 267/265 |
| 5,848,617 A | * | 12/1998 | Enomoto ..................... | 138/109 |
| 6,068,250 A | * | 5/2000 | Hawkins et al. ............ | 267/162 |

* cited by examiner

Primary Examiner—Robert J. Oberleitner
Assistant Examiner—Melanie Torres
(74) Attorney, Agent, or Firm—John E. Kajander

(57) ABSTRACT

An accordion spring that replaces traditional coil springs in suspension systems. The accordion springs are made of a fiberglass composite and can be designed to have a linear or progressive spring rate upon compression. To achieve a linear spring rate, the shape of the accordion spring is symmetrical with both the top and bottom surfaces of each of the plurality of central regions of the spring are flat, wherein contact between the upper and lower surfaces of adjacent central regions will not occur until the accordion spring has bottomed out. A series of complementary bent regions are introduced to the spoked regions of the accordion spring that varies the spring rate of the spring as the spring is compressed. The accordion spring can be manufactured using a three-dimensional weaving process and offer improvements in weight reduction, mass reduction, packaging space reduction compared to traditional steel coil springs.

9 Claims, 4 Drawing Sheets

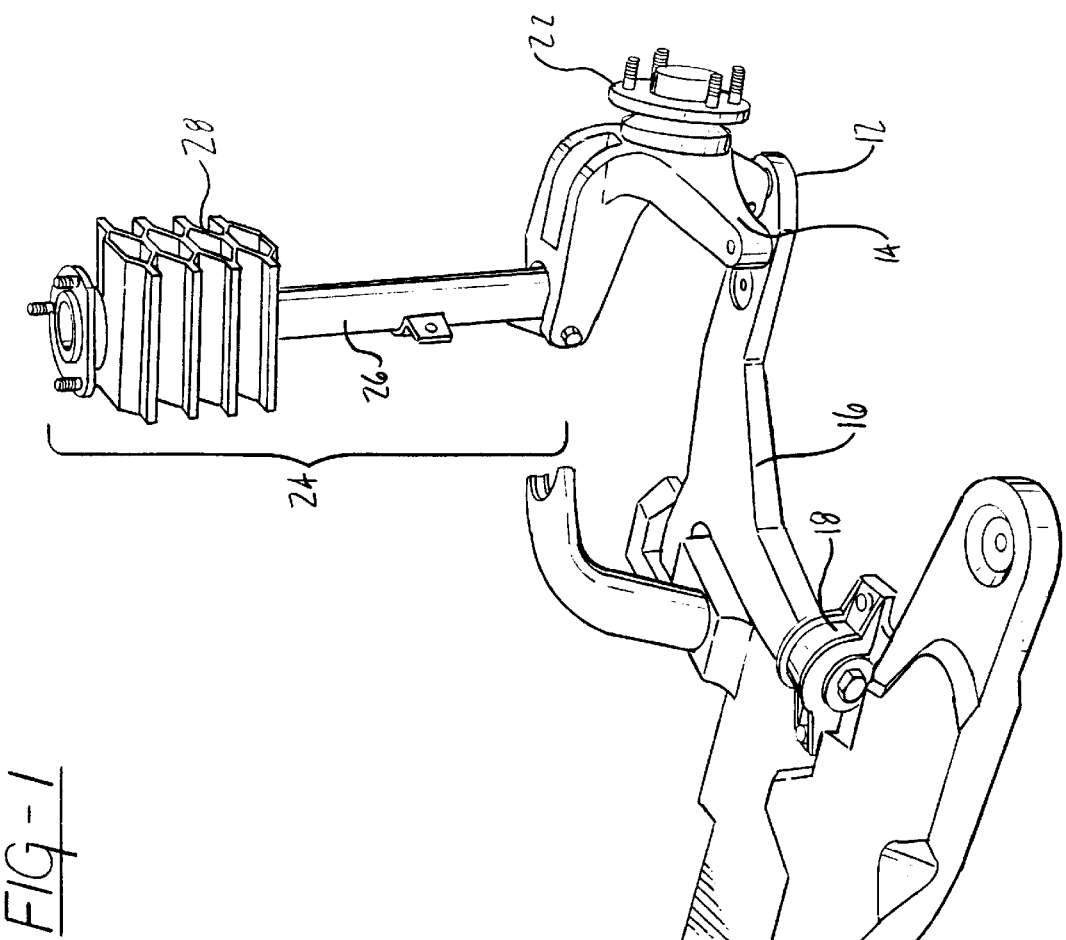
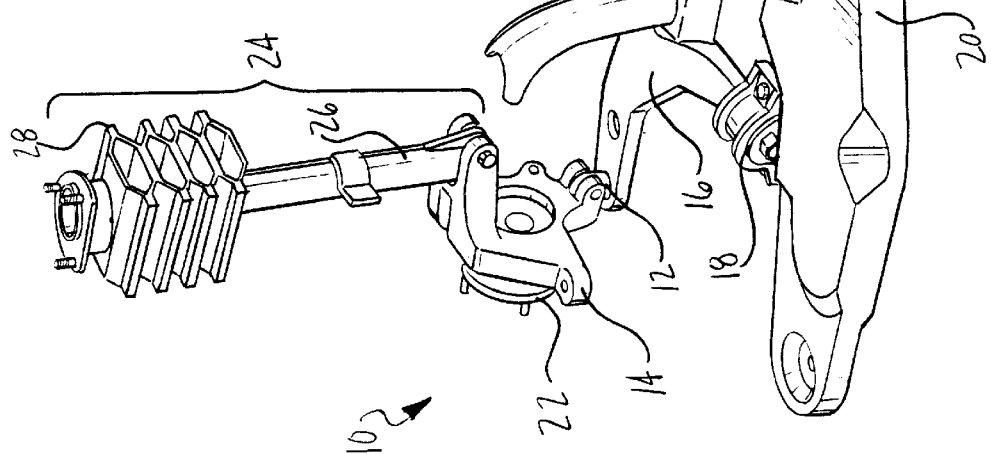
FIG-1

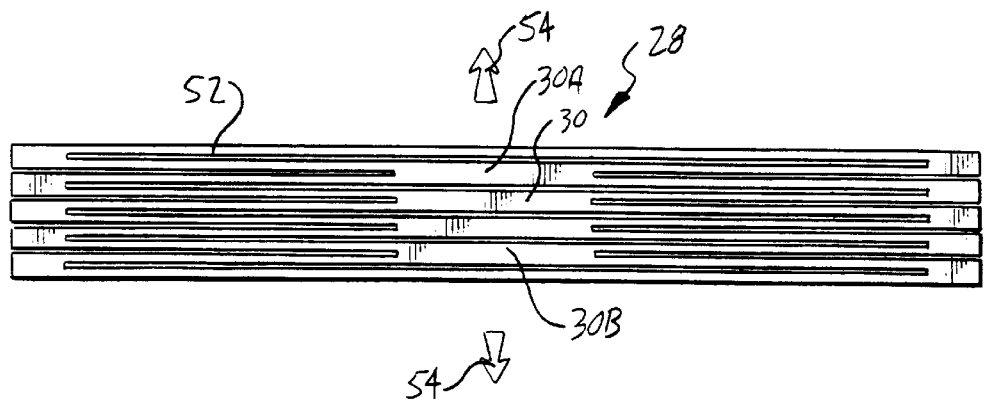
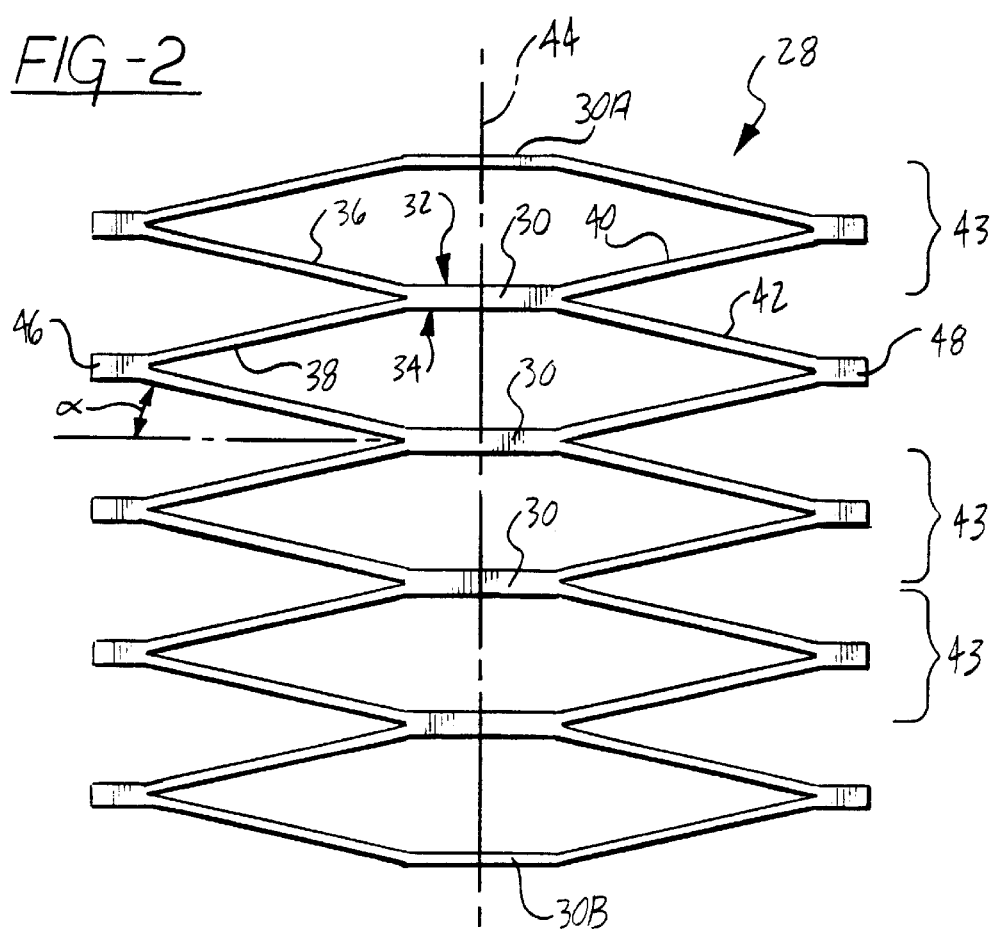

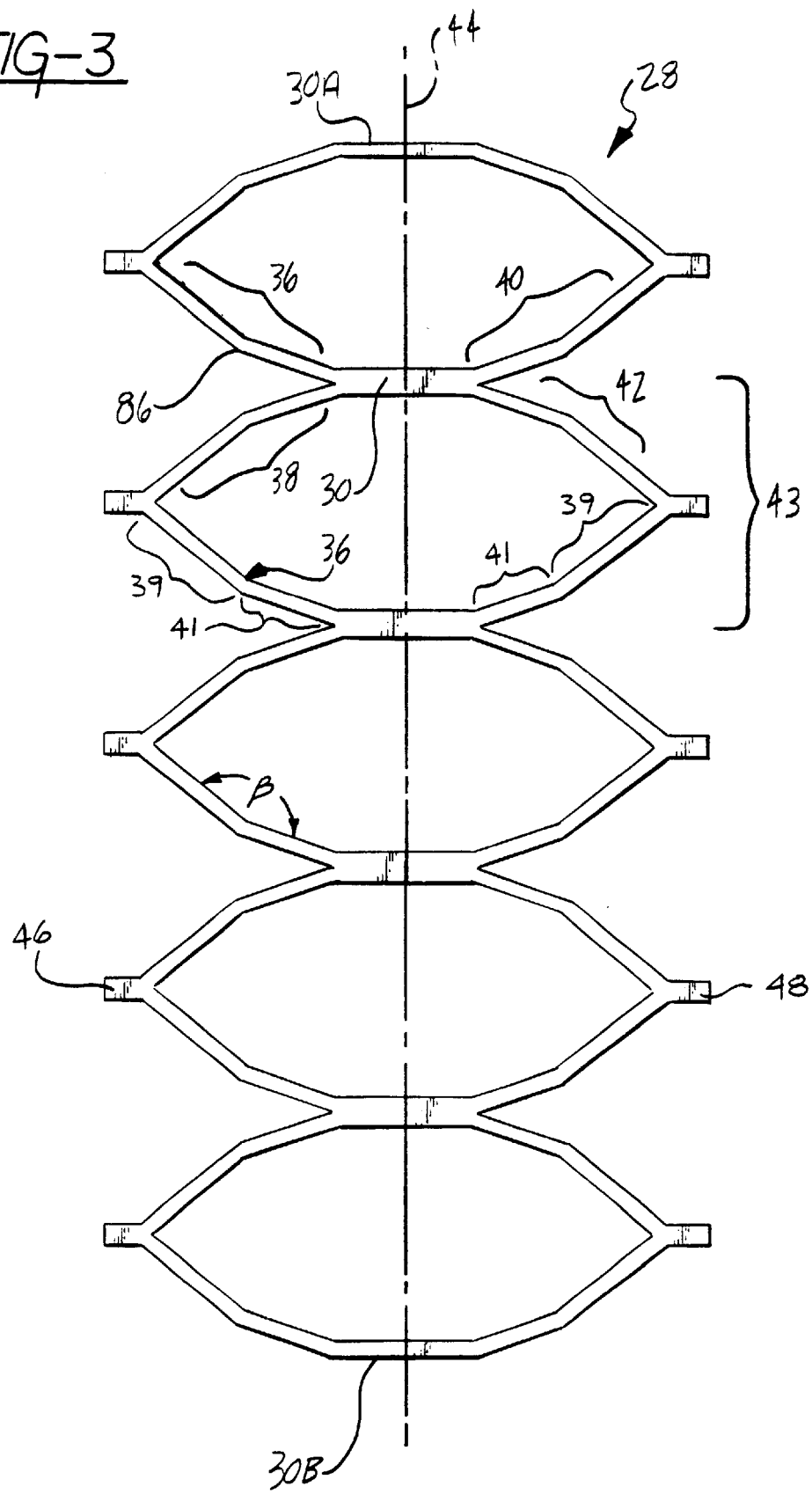

COMPOSITE PROGRESSIVE ACCORDION SPRING

TECHNICAL FIELD

The present invention relates generally to suspension systems and more particularly to composite progressive accordion springs for use in suspension systems.

BACKGROUND

Suspension systems on vehicles work in cooperation with the tires, frame or unit body, wheels, wheel bearings, brake system, and steering system to provide safe and comfortable means of transportation. Suspension systems have several important functions, including supporting the various components of an automobile, allowing the tires to move up and down to provide a comfortable ride, allowing for rapid cornering without extreme body roll, keeping the tires on the road surfaces, preventing excessive body squat when accelerating, preventing excessive body dive when braking, allowing the front wheels to turn side-to-side for steering, and, in combination with the steering system, keeping the wheels in correct alignment.

Typical suspension systems utilize springs, swivel joints, damping devices, moveable arms and other components to accomplish these functions. The springs that are used within suspension systems have two primary functions. First, the springs jounce (compress) and rebound (extend) when the tires encounter objects and holes in the road surface. The springs also support the weight of the vehicle while still allowing suspension travel (movement).

The most common type of springs found on modern suspension systems are coil springs. Coil springs may be used on either the front or rear of the car and are typically a length of spring steel rod wound into a spiral.

Traditional coil springs have several problems. First, traditional coils have high mass which tends to lead to decreased performance in vehicles, such as with fuel economy. Second, coil springs require significant packaging space within the vehicle. This typically leads to design compromises that add mass, compromise suspension performance, and/or deteriorate styling of the vehicle. Third, traditional coils are typically limited to linear spring rates, as progressive spring rates are costly to manufacture.

It is thus highly desirable to develop a new spring mechanism for suspension systems that alleviates or eliminates these problems.

SUMMARY OF THE INVENTION

It is thus an object of the present invention to create a lower mass, lighter spring that can be designed with linear or progressive spring rates.

The above object is accomplished providing a progressive accordion spring made of fiberglass composite. This accordion spring can be designed to have either a linear or a combination of linear and progressive spring characteristics.

The accordion spring may be used on either the rear suspension or front suspension of a vehicle. To achieve a linear spring rate, the shape of the accordion spring is symmetrical with both the top and bottom surface being flat, wherein contact between the upper and lower surface within a central region will not occur until the spring is bottomed out. To achieve a bi-linear spring rate, a series of bent regions are introduced in a symmetrical manner to the accordion spring along a spoked region.

Other objects and advantages of the present invention will become apparent upon considering the following detailed description and appended claims, and upon reference to the accompanying drawings.

BRIEF DESCRIPTION OF THE DRAWINGS

FIG. 1 shows a suspension system having an accordion spring according to a preferred embodiment of the present invention;

FIG. 2 shows an accordion spring having a linear spring rate according to one preferred embodiment of the present invention;

FIG. 3 shows an accordion spring having a bi-linear spring rate according to another preferred embodiment of the present invention;

FIG. 5 shows the manufacture of a progressive spring as in FIG. 2 contained within a preform prior to being pulled to its desired shape.

DESCRIPTION OF THE PREFERRED EMBODIMENT(s)

Figure 4A:
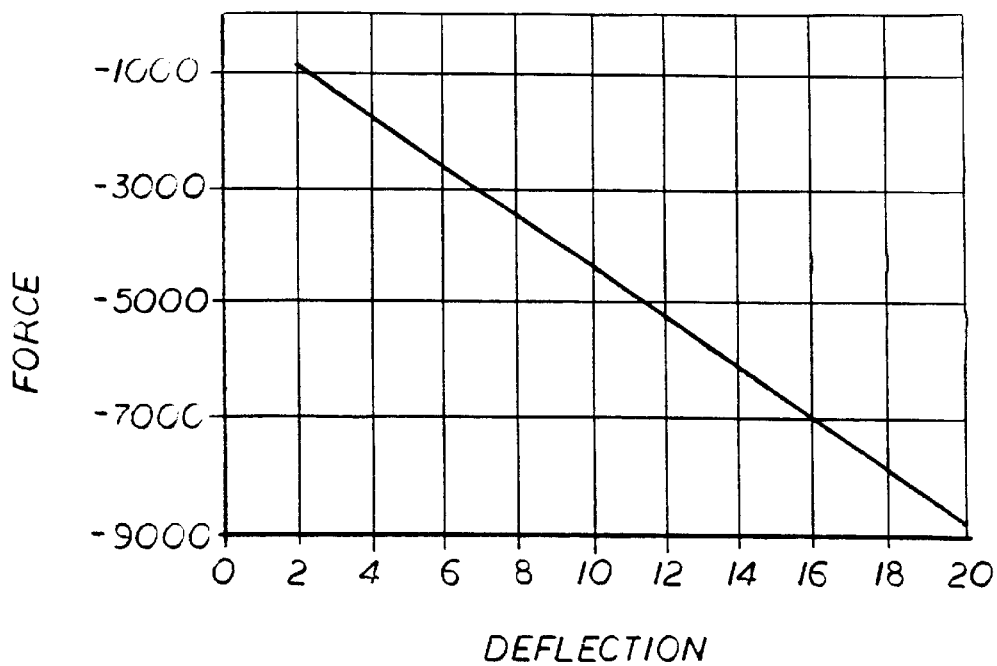
FIG. 4A is a graphical representation of the force versus deflection curve of an accordion spring as in FIG. 2.

Referring now to FIG. 1, a front suspension system 10 is depicted according to a preferred embodiment having a pair of ball joints 12 that fasten a pair of steering knuckles 14 to a pair of lower control arms 16. The inner end of each of the lower control arms 16 has a bushing 18 for fastening the lower control arms 16 to the vehicle subframe 20. Each steering knuckle is also coupled to a hub 22 and to a strut assembly 24. The strut assembly 24 has as its major components a damper 26 and an accordion spring 28. While depicted on a front suspension 10, the accordion spring 28 according to the present invention may also be used on a rear suspension system (not shown).

FIG. 2 shows an accordion spring 28 according to one preferred embodiment of the present invention having a linear spring rate, while FIG. 3 shows an accordion spring 28 according to another preferred embodiment of the present invention having a bi-linear, or progressive, spring rate.

Referring now to FIG. 2, the shape of the accordion spring 28 is symmetrical about a center line 44 and is perpendicular to the center line 44 along a top surface 32 and bottom surface 34 of each central region 30. A left upper spoke 36, a left lower spoke 38, a right upper spoke 40, and a right lower spoke 42 extend from each central region 30 in a linear and symmetrical fashion about center line 44. From top to bottom as depicted in FIG. 2, each left lower spoke 38 is coupled with each adjacent left upper spoke 36 to form a left side region 46, and each right lower spoke 42 is coupled with each adjacent right upper spoke 40 to form a right side region 48. Of course, the topmost central region 30A has only a left lower spoke 38 and right lower spoke 42, while the bottommost central region 30B has only a left upper spoke 36 and right upper spoke 40. Each left side region 46, right side region 48, and pair of adjacent central regions 30 containing spokes 36, 38, 40, 42 define a resilient member 43.

As force is applied on the spring 28, the spring 28 will deflect in a linear and consistent manner until it cannot bend any further, at a point where the entire top surface 32 of one central region 30 is in contact with the entire bottom surface 34 of the next adjacent central region 30. FIG. 4A shows the linear relationship of a force and deflection curve of the accordion spring 28 as depicted in FIG. 2. The slope of the force versus deflection curve is a function of the stiffness of the spring 28 and the length of the spokes 36, 38, 40, 42. The stiffness of the spring 28 may vary greatly as a function of the width, depth, thickness, material composition, and number of spoked regions within the spring 28.

Figure 4B:
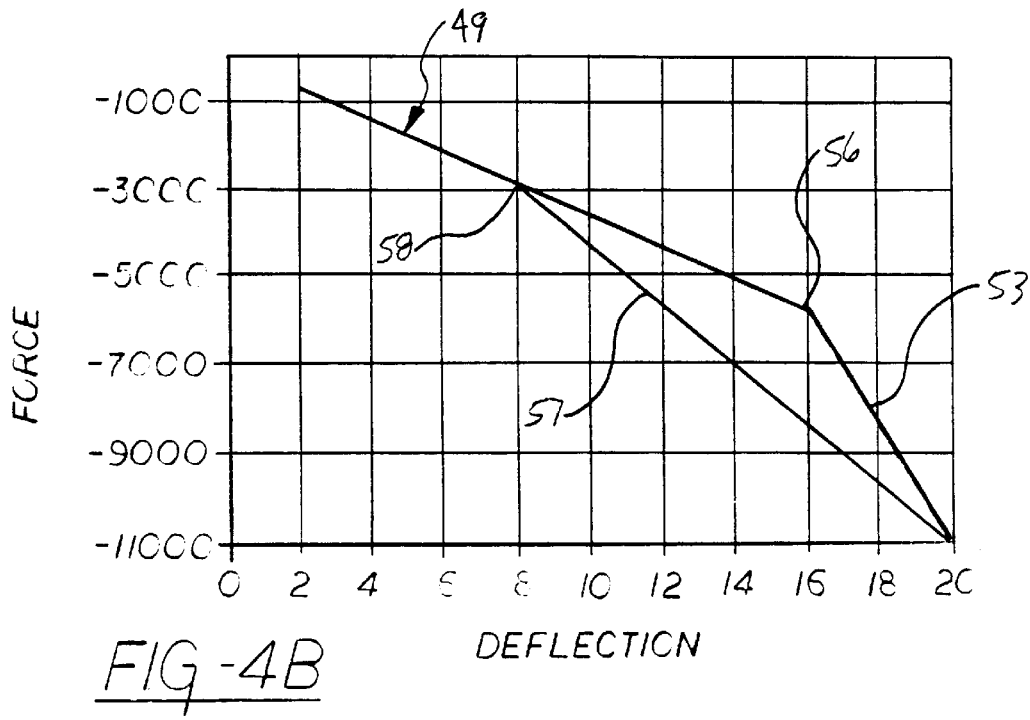
FIG. 4B is a graphical representation of the force versus deflection curve of an accordion spring as in FIG. 3.

In FIG. 3, a bend 86 having an angle E is located within each spoke 36, 38, 40, 42, at a point between each central region 30 and respective side region 46, 48. As depicted in FIG. 4B, as force is applied to the spring 28, the spring 28 will deflect in a linear manner along line 49 until reaching the bend 86. At this point, corresponding to point 56, the spring rate (the change in force needed to achieve a certain additional deflection) is increased along line 53. The slope of line 49 is approximately inversely proportional to the length, represented by 41, between the bend 86 and its respective center region 30, while the slope of line 53 is approximately inversely proportional to the length, represented by 39, of the spoke between the bend 86 and its respective side region 46, 48.

If the location of the bend 86 was moved closer to its corresponding central region, thus making the length 39 longer, the force versus deflection curve would correspondingly change. The initial spring rate, as depicted along line 49, will remain the same, assuming the same overall spoke 36, 38, 40, 42, length. However after reaching point 58, corresponding to the new bend 86 location, the slope along line 57 would change at a rate that is less than originally depicted along line 53. This new second spring rate is approximately inversely proportional to length 39. Thus, as the length 39 increases, the secondary spring rate correspondingly decreases.

By adding more and more bends similar to 36 within the spring 28, the progressive spring rate can be correspondingly modified to meet the user demands. Further, as above, in addition to increasing the number of bends 86, the stiffness of the spring 28 may vary greatly as a function of the width, depth, thickness, material composition, and number of central regions 30 within the spring 28.

The accordion spring 28 may be created by a variety of different methods. One preferred method weaves the accordion spring 28 using a 3-D woven process that is commonly used to manufacturing textile reinforcements in composite materials. Glass fibers, preferable E-type fiberglass, are woven in either a weft or warp direction into a flat preform by known techniques. As depicted in FIG. 5, a series of slits 52, or notches, are integrally woven in the composite fiber preform. The composite fiber preform is then pulled from opposite ends, as depicted by arrows 54, to shape the spring 28 as desired. The pulled composite fiber preform is then placed within a mold, infused with resin, and heated to form the spring 28 having a desired shape and size. Inflatable bladders may be used on the internal slits 52 to aid in molding the parts. A long continuous length of the spring 28 cross-section may be molded at once, and then cut into multiple pieces after the resin is cured. As the mold is heated, the resin is cured (crosslinked) to bind the fiberglass fibers together into a composite fiber preform. FIG. 2 depicts the spring 28 of FIG. 5 after it has been pulled and molded to its desired shape. Depending upon the number and the size of the slits 52 made, as well as the post-pulling molding that is performed (for example bends could be introduced within the mold to form a progressive spring) on the preform, a wide variety of springs 28 with different progressive characteristics can be made.

In another alternative arrangement, a fiber preform can be created by stitching together multiple layers of two-dimensional glass fiber woven cloth or unidirectional fiber tape. These layers may be stitched together using an industrial sewing machine and could be preformed in an automated continuous process. The preform can then be processed as depicted above to form the accordion spring 28 having linear or progressive spring rate characteristics.

The accordion spring 28 offers many improvements over traditional coil springs. First, accordion springs 28 with similar spring rates and total deflections may be made with less mass and free length than traditional coil springs. In one representative embodiment of the present invention, a front accordion spring 28 for use in a sport utility vehicle weighed almost 56% less (3.4 kg vs. 1.5 kg) and required over 39% less (from 255 mm to 155 mm) free length to achieve the same spring rate and total deflection as a traditional coil spring. This reduction of mass and free length results in increased packaging efficiency of accordion springs versus traditional coil springs.

Second, the linear spring rate of the accordion spring 28 could be easily modified to either increase or decrease the linear spring rate by simply varying the accordion spring's 28 manufacturing techniques or composition, or any combination thereof, to meet a specific desired spring rate. For example, the linear spring rate could be modified by either varying the size or location of slits 52 made in the preform. Alternatively, the linear spring rate could be modified by varying the thickness of the spokes 36, 38, 40, 42 in the accordion spring 28.

Third, progressive spring rates may introduced without adding additional weight or costs by simply introducing a bend 86 or series of bends 86 to complementary regions of each spoke 38. 40, 42, 44. These bends 86 increase the force versus deflection rate of the spring 28 as it is compressed beyond the bend 86.

While the invention has been described in terms of preferred embodiments, it will be understood, of course, that the invention is not limited thereto since modifications may be made by those skilled in the art, particularly in light of the foregoing teachings. For example, it is contemplated that the accordion spring may be used in a wide variety of applications not related to automotive suspension systems. One such example is to use accordion springs 28 on mountain bikes or other bikes requiring spring like suspension systems. Further, it is specifically contemplated that the accordion spring 28 could be a multipiece unit, as compared with a single piece as in the preferred embodiments. This could be accomplished by simply manufacturing the resilient members 43 and then stacking the resilient members 43 on top of each other to form the accordion spring 28.

What is claimed is:

1. A method for making an accordion spring for use in an automotive suspension system, the method comprising the steps of:

three dimensional weaving a plurality of glass fibers into a preform;

weaving at least one notch through said preform;

mechanically pulling said preform to a first desired shape;

placing said preform into a mold;

adding a first quantity of curable resin to said preform to form a composite;

molding said composite to a second desired shape; and removing said composite from said mold.

2. The method of claim 1, wherein the step of three dimensional weaving a plurality of glass fibers onto a preform comprises the step of weft knitting a plurality of E-type glass fibers into a preform.

3. The method of claim 1, wherein the step of three dimensional weaving a plurality of glass fibers onto a preform comprises the step of warp knitting a plurality of E-type glass fibers into a preform.

4. The method of claim 1, wherein the accordion spring having said second desired shape has a linear spring rate when compressed.

5. The method of claim 1, wherein the accordion spring having said second desired shape has a progressive spring rate when compressed.

6. The method of claim 1, wherein the step of adding a first quantity of curable resin to said preform comprises the step of adding a first quantity of curable epoxy resin to said preform.

7. A method for yielding progressive spring rates in suspension systems, the method comprising the steps of:

three dimensional weaving a plurality of glass fibers into a preform;

weaving at least one slit through said preform;

mechanically pulling said preform from opposite ends to a first desired shape;

placing said preform in a mold;

adding a first quantity of curable resin to said preform to form a composite;

molding said composite to a second desired shape, said second desired shape comprising an accordion spring having a plurality of symmetrical resilient members, each of said plurality of symmetrical resilient members having an upper central region having a first upper side and a first lower side, a lower central region having a second upper side and a second lower side, a right side region, a left side region, and four spoke regions; wherein one of said four spoke regions coupled between said upper central region and said right side region, a second of said four spoke regions coupled between said upper central region and said left side region, a third of said four spoke regions coupled between said lower central region and said right side region, and a fourth of said four spoke regions coupled between said lower central region and said left side region; wherein each of said spoke regions has at least one bend located within its length;

removing said accordion spring from said mold; and placing said accordion spring into the suspension system.

8. A method for yielding progressive spring rates in suspension systems, the method comprising the steps of:

stitching together multiple layers of a two dimensional glass woven cloth into a preform such that said preform has at least one slit through said preform;

mechanically pulling said preform from opposite ends to a first desired shape;

placing said preform in a mold;

adding a first quantity of curable resin to said preform to form a composite;

molding said composite to a second desired shape, said second desired shape comprising an accordion spring having a plurality of symmetrical resilient members, each of said plurality of symmetrical resilient members having an upper central region having a first upper side and a first lower side, a lower central region having a second upper side and a second lower side, a right side region, a left side region, and four spoke regions; wherein one of said four spoke regions coupled between said upper central region and said right side region, a second of said four spoke regions coupled between said upper central region and said left side region, a third of said four spoke regions coupled between said lower central region and said right side region, and a fourth of said four spoke regions coupled between said lower central region and said left side region; wherein each of said spoke regions has at least one bend located within its length;

removing said accordion spring from said mold; and placing said accordion spring into the suspension system.

9. A method for yielding progressive spring rates in suspension systems, the method comprising the steps of:

stitching together multiple layers of a unidirectional fiber tape into a preform;

weaving at least one slit through said preform;

mechanically pulling said preform from opposite ends to a first desired shape;

placing said preform in a mold;

adding a first quantity of curable resin to said preform to form a composite;

molding said composite to a second desired shape, said second desired shape comprising an accordion spring having a plurality of symmetrical resilient members, each of said plurality of symmetrical resilient members having an upper central region having a first upper side and a first lower side, a lower central region having a second upper side and a second lower side, a right side region, a left side region, and four spoke regions; wherein one of said four spoke regions coupled between said upper central region and said right side region, a second of said four spoke regions coupled between said upper central region and said left side region, a third of said four spoke regions coupled between said lower central region and said right side region, and a fourth of said four spoke regions coupled between said lower central region and said left side region; wherein each of said spoke regions has at least one bend located within its length;

removing said accordion spring from said mold; and placing said accordion spring into the suspension system.

* * * * *